(12) United States Patent
George

(10) Patent No.: US 11,238,214 B1
(45) Date of Patent: Feb. 1, 2022

(54) SYSTEMS AND TECHNIQUES FOR SECURELY PROCESSING DISPARATE DATA SETS IN SPREADSHEETS

(71) Applicant: Georgetown Software House, Inc., Washington, DC (US)

(72) Inventor: Bediako Ntodi George, Washington, DC (US)

(73) Assignee: Georgetown Software House, Inc., Washington, DC (US)

( * ) Notice: Subject to any disclaimer, the term of this patent is extended or adjusted under 35 U.S.C. 154(b) by 17 days.

(21) Appl. No.: 16/940,661

(22) Filed: Jul. 28, 2020

(51) Int. Cl.
*G06F 40/18* (2020.01)
*G06F 21/60* (2013.01)
*G06K 9/62* (2006.01)

(52) U.S. Cl.
CPC ............ *G06F 40/18* (2020.01); *G06F 21/602* (2013.01); *G06K 9/6267* (2013.01)

(58) Field of Classification Search
CPC ..................................................... G06F 40/18
See application file for complete search history.

(56) References Cited

U.S. PATENT DOCUMENTS

| 8,082,489 | B2 | 12/2011 | Jiang | |
|---|---|---|---|---|
| 9,805,017 | B2 | 10/2017 | Krueger | |
| 9,805,080 | B2 | 10/2017 | Joshi et al. | |
| 9,824,081 | B2 * | 11/2017 | Lehmann et al. | .... G06F 17/246 |
| 2018/0276417 | A1 * | 9/2018 | Cerezo Sanchez | ..... G06F 21/72 |

* cited by examiner

*Primary Examiner* — James J Debrow
(74) *Attorney, Agent, or Firm* — Bass Patent Law, LLC

(57) ABSTRACT

An aspect of the present teachings generally includes a data processing platform (e.g., a platform hosted by a remote computing resource) that analyzes and compiles information contained in a source spreadsheet, e.g., to ascertain how the source spreadsheet manipulates input data. The data processing platform may create an encrypted file related to the source spreadsheet that includes transformed input data and/or directives that define functionality of the source spreadsheet, e.g., where the encrypted file is specifically tailored for use on the data processing platform for a particular user or set of users. Also, or instead, the data processing platform may create or otherwise utilize one or more runtimes that, when executed in conjunction with the encrypted file, can mimic functionality of the source spreadsheet and/or other useful functionality applied to the input data or other disparate data.

20 Claims, 3 Drawing Sheets

SYSTEMS AND TECHNIQUES FOR SECURELY PROCESSING DISPARATE DATA SETS IN SPREADSHEETS

FIELD

The present disclosure generally relates to systems and techniques for securely processing disparate data sets in spreadsheets, e.g., techniques for receiving data and processing that data in a manner substantially consistent with that of the functionality of a source spreadsheet, but without the use of a desktop spreadsheet application.

BACKGROUND

A spreadsheet is a document including a collection of cells containing data items such as numbers, strings, dates, and so on. Cells may also or instead include instructions—e.g., computational instructions such as formulas and functions, and/or snippets of code, pointers and references to other cells, and the like. Cells may also or instead contain other types of information such as data formatting information, presentation information, form widgets, descriptive notes or comments, and so on. Cells in a spreadsheet may be arranged in a geometric fashion, typically in rows and columns having unique names. These rows and columns can also be grouped, where these groups are typically referred to as worksheets. A cell's location in a spreadsheet is usually specified using a combination of the worksheet name and the row/column in which the cell resides.

Cell generation generally refers to the creation of a new cell that is added to a worksheet within a spreadsheet. Cell generation can also or instead refer to other methods of creating cells such as copying existing cells and/or moving a cell from one location to another. Cells may be generated singly or in groups.

Cell manipulation generally refers to the replacement of an existing cell with a new cell, and/or updating the contents of an existing cell with new data, computational instructions, or the like. Cell manipulation may also or instead include removing a cell from a spreadsheet. Cells may be manipulated singly or in groups.

Cell arrangement generally refers to the spatial association of cells in columns or rows. This may include specifying or changing the ordering, grouping, and/or dependencies of cells. Cells may be arranged singly or in groups.

Most spreadsheet applications provide cell generation, manipulation, and arrangement functionality for users via a computing device having a user interface. In a commonplace spreadsheet application, users may create new cells by using a computer mouse to click on a visual representation of a cell, usually a box, then using their keyboard a user can enter new information into the cell. The user may also choose to later copy, update, or remove the cell via the user interface. The user may also choose to sort or group existing cells using the user interface. The user can specify how many cells are generated, manipulated, or arranged, and the user can make decisions on starting or stopping the generation, manipulation, or arrangement based on visual feedback provided in the user interface. This functionality is well understood, where a salient characteristic of this existing user interface is that the cell generation, manipulation, and arrangement instructions directed by the user via the application's user interface happens substantially immediately and within the spreadsheet itself.

A drawback to using desktop or web-based spreadsheets as a computational tool is that they generally require hands-on, human-based interaction to manipulate and generate data and/or cells. This can make it extremely difficult or impossible to run spreadsheet computations at scale. In order to overcome this limitation, spreadsheet users often employ computer programmers to translate the calculations within a spreadsheet to another computing language and platform in order to achieve automation and scalability. Such spreadsheet translation is time consuming—it is a manual process that, depending on the size of a spreadsheet, could take weeks, months, or even years to accomplish.

There remains a need for improved systems and techniques to run spreadsheet computations at scale, e.g., in an automated fashion without using excessive computational resources. Moreover, there generally remains a need for improved systems and techniques for securely processing disparate data sets in spreadsheets.

SUMMARY

An aspect of the present teachings generally includes a data processing platform (e.g., a platform hosted by a remote computing resource) that analyzes and compiles information contained in a source spreadsheet, e.g., to ascertain how the source spreadsheet manipulates input data. The data processing platform may create an encrypted file related to the source spreadsheet that includes transformed input data and/or directives that define functionality of the source spreadsheet, e.g., where the encrypted file is specifically tailored for use on the data processing platform for a particular user or set of users. Also, or instead, the data processing platform may create or otherwise utilize one or more runtimes that, when executed in conjunction with the encrypted file, can mimic functionality of the source spreadsheet and/or other useful functionality applied to the input data or other disparate data.

In an aspect, a method disclosed herein for securely processing disparate data sets according to functionality of a spreadsheet may include: receiving a source spreadsheet from a user, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set; compiling the source spreadsheet including translating data within the source spreadsheet into an intermediary form and extracting the one or more directives; writing output of the compiling of the source spreadsheet to a file; encrypting the file with an encryption key associated with the user thereby creating an encrypted file; and reading and executing the encrypted file using a runtime associated with the user.

Implementations may include one or more of the following features. The method may further include receiving a second input data set different from the first input data set. Reading and executing the encrypted file using the runtime may include applying and manipulating the second input data set in a manner consistent with the manipulation of the first input data set in the source spreadsheet thereby generating a second output data set. The runtime may extract information from the encrypted file to manipulate input data different from the first input data set according to functionality of the source spreadsheet. The information extracted from the encrypted file may include one or more of the intermediary form of the data, the one or more directives, dependency information, and a worksheet classification. Compiling the source spreadsheet may further include extracting dependency information and one or more worksheet classifications. Compiling the source spreadsheet may further include analyzing the source spreadsheet to identify one or more worksheets of the source spreadsheet, and to identify and extract formulas included within the one or more worksheets. Compiling the source spreadsheet may further include creating intermediary forms for the formulas included within the one or more worksheets. The one or more directives may be embedded within the source spreadsheet. The one or more directives may be disposed within one or more of a note and a comment included within the source spreadsheet. The one or more directives may define functionality of the source spreadsheet. The one or more directives may define the first input data set. The one or more directives may include information regarding at least one of sorting and identification of data in the source spreadsheet. The one or more directives may be associated with one or more cells of the source spreadsheet. The one or more directives may include information related to at least one of creating a cell, copying a cell, stopping cell generation, filtering a cell, sorting a cell, reordering a cell, labeling a cell, removing a cell, storing a cell, cell generation, and discarding a cell. An association of the one or more directives to the one or more cells may be determined through an analysis of one or more of a comment, a note, a named reference, a worksheet, and a cell of the source spreadsheet. The one or more directives may be attached to the source spreadsheet. The one or more directives may be manually added by a user. The one or more directives may be automatically generated as one or more of data and formulas are entered into the source spreadsheet. The one or more directives may include plain text. The one or more directives may include natural language. The one or more directives may include an action to be taken by the runtime. The runtime may be a library that executes logic stored in the encrypted file. The runtime may be configured to decrypt the encrypted file. The runtime may operate according to one or more rules, where the one or more rules identify one or more permissible combinations for execution of the one or more directives. The one or more rules may specify one or more of an order and a context for execution of the one or more directives. Logic of the runtime and logic of the encrypted file may be separate. The runtime may be platform specific. The user may be associated with an enterprise, the enterprise having permissions for accessing one or more of the encrypted file and the runtime. The permissions of the enterprise may provide the user with access to a plurality of runtimes including the runtime associated with the user. The method may further include presenting a list of the plurality of runtimes to the user for selection of one or more of the plurality of runtimes. The permissions of the enterprise may provide access to a plurality of encrypted files. The method may further include verifying that the runtime and the encrypted file are associated with the user. The method may further include preventing use of the encrypted file by the runtime when an association of one or more of the runtime and the encrypted file with the user cannot be verified. The file may include one or more of the intermediary form of the data, the one or more directives, dependency information, and a worksheet classification. The file may further include one or more of an expiration date, an execution password, and information specifically tailored for reading by the runtime. The source spreadsheet may be received via an uploading of the source spreadsheet onto a web-based platform. The method may further include collecting information related to a structure of the source spreadsheet. The method may further include combining or associating the encrypted file with one or more other encrypted files created from one or more other, different spreadsheets.

In an aspect, a computer program product disclosed herein for securely processing disparate data sets according to functionality of a spreadsheet may include computer executable code embodied in a non-transitory computer readable medium that, when executing on one or more computing devices, performs the steps of: receiving a source spreadsheet from a user, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set; compiling the source spreadsheet including translating data within the source spreadsheet into an intermediary form and extracting the one or more directives; writing output of the compiling of the source spreadsheet to a file; encrypting the file with an encryption key associated with the user thereby creating an encrypted file; and reading and executing the encrypted file using a runtime associated with the user.

In an aspect, a system disclosed herein for securely processing disparate data sets according to functionality of a spreadsheet may include a data network, a user device coupled to the data network, and a remote computing resource coupled to the data network and accessible to the user device through the data network, the remote computing resource including a processor and a memory, the memory storing code executable by the processor to perform the steps of: receiving a source spreadsheet from the user over the data network, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set; compiling the source spreadsheet including translating data within the source spreadsheet into an intermediary form and extracting the one or more directives; writing output of the compiling of the source spreadsheet to a file; encrypting the file with an encryption key associated with the user thereby creating an encrypted file; and reading and executing the encrypted file using a runtime associated with the user.

Implementations may include one or more of the following features. The code may further perform the step of transmitting one or more of the encrypted file and the runtime to the user device over the data network. The code may further perform the step of transmitting output from the runtime to the user device over the data network.

These and other features, aspects, and advantages of the present teachings will become better understood with reference to the following description, examples, and appended claims.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
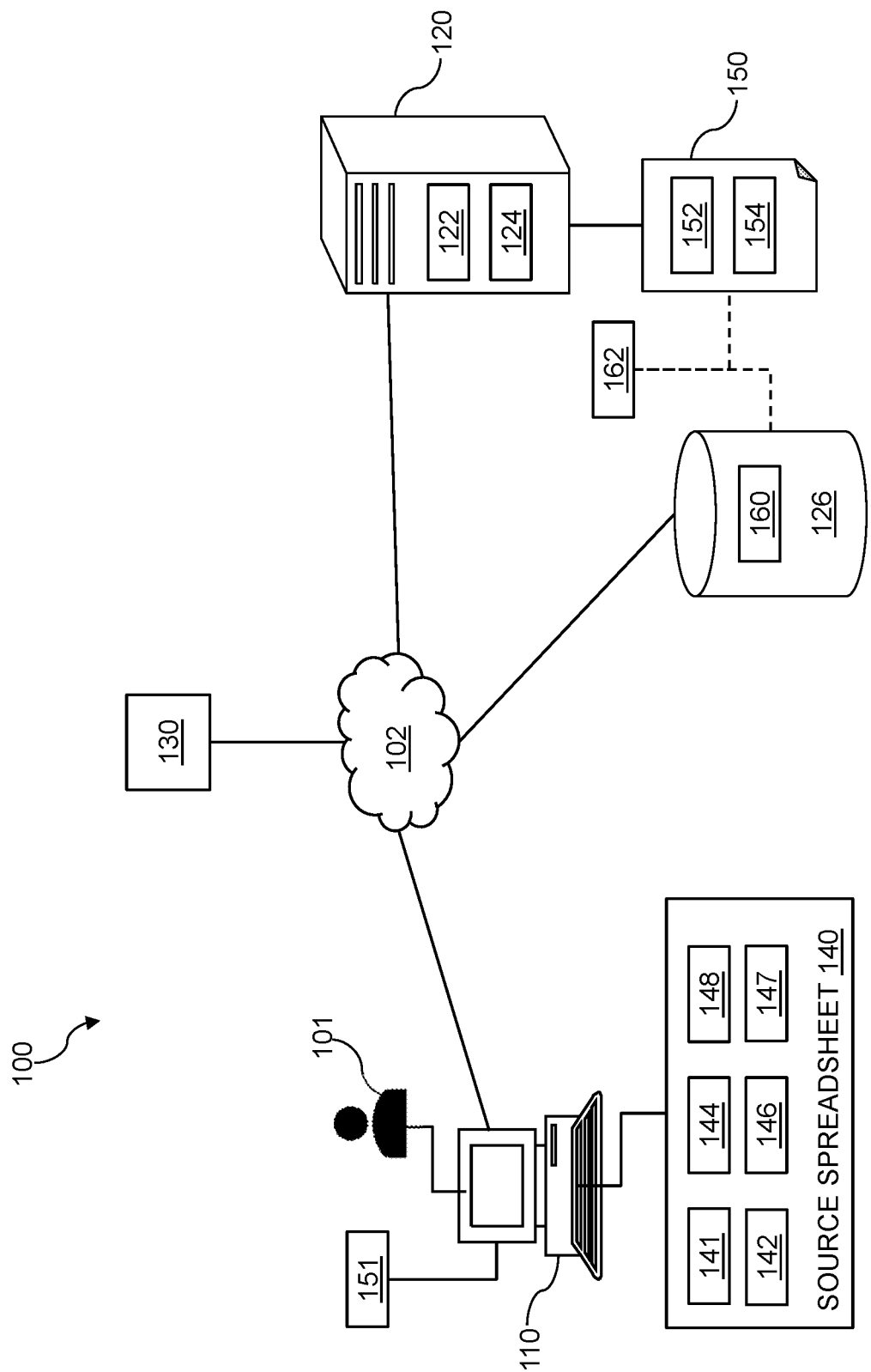
FIG. 1 illustrates a system for securely processing disparate data sets in spreadsheets, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

In general, the devices, systems, and methods disclosed herein relate to systems and techniques to run spreadsheet computations at scale. Further, the present teachings include systems and techniques for securely processing disparate data sets in spreadsheets. That is, an aspect of the present teachings includes a data processing platform with components (e.g., hardware and/or software components) configured to analyze a source spreadsheet in order to ascertain the type of input data included therein and to identify how the source spreadsheet manipulates that input data or otherwise generates output data therefrom. Moreover, the data processing platform may create a file related to the source spreadsheet that includes transformed input data and/or directives that define functionality of the source spreadsheet. This file may be encrypted or otherwise protected such that only a user (or a set of users, e.g., an enterprise) having proper authorization can access and/or use this file. The data processing platform may create or otherwise utilize one or more runtimes that, when executed in conjunction with the file, can mimic functionality of the source spreadsheet and/or other useful functionality applied to the input data or other disparate data that is different from the input data.

It will be understood that the term "disparate data" is used herein as a relative term to describe data that may be different from other data. For example, and generally in the context of embodiments of the present teachings, a source spreadsheet is provided that contains certain initial data, which may be referred to herein as "first input data," "source data," "initial data," or similar. The present teachings may generally provide systems and techniques that can then receive other data and perform similar operations and functionality on this other data in the same or similar manner as the source spreadsheet, where this other data is "disparate data" relative to the initial data of the source spreadsheet, since it can be quite different from the initial data of the source spreadsheet. That is, "disparate data" as used herein may include data that is different from the initial data of the source spreadsheet. For example, disparate data may be vastly different than the initial data—e.g., containing much more or less quantities, having vastly different values, be in a different format, and so on. Additionally, or alternatively, disparate data may be only slightly different than the initial data—e.g., containing similar quantities and values, containing updated data, and so on. In some aspects, disparate data may also or instead be varying data from the initial data—e.g., data that is more current that the initial data, data where a change is applied to the initial data which can be singular or a data-wide change, and so on. Moreover, in an aspect, disparate data may be the same as the initial data of the source spreadsheet—e.g., when testing implementations of the present teachings, or simply when the data has not changed from initial data, which can be purely coincidental depending on circumstances. Thus, it will generally be understood that disparate data includes data that is separate and distinct from the initial data of the source spreadsheet, where an aim of an aspect of the present teachings is to manipulate the disparate data in the same or similar manner as the initial data of the source spreadsheet was manipulated therein, but without the use of a traditional spreadsheet application.

The present teachings may be similar to concepts discussed and contemplated in the applicant's own U.S. Patent Application Publication No. 2019/0243891 (now abandoned), the entire content of which is hereby incorporated by reference herein. Similar to the aforementioned application, the present teachings may involve techniques for deferring (temporally and spatially) the generation, manipulation, and arrangement of cells in an electronic spreadsheet.

It will thus be understood that the present teachings may include associating, attaching, and/or embedding directives within a spreadsheet for subsequent use thereof for the generation, manipulation, and/or arrangement of cells in the spreadsheet, where use of these directives may thereby relieve spreadsheet users of the need to manually perform such cell generation, manipulation, or arrangements. As described herein, a directive may indicate a specific action to be taken before, after, or during the generation, manipulation, or arrangement of cells in a spreadsheet. In an aspect, a user creates or otherwise receives a spreadsheet, then associates one or more directives to the spreadsheet, where a directive may indicate an action a server module or the like may perform on the spreadsheet on behalf of the user. The order in which the directives are performed may be specified by a convention or rule, which may be published and/or otherwise known to the user before use.

Using a submission module that may be part of an online platform that performs techniques of the present teachings, a spreadsheet and input data, along with the associated spreadsheet directives may be submitted to a parser module (e.g., an analysis engine operating on a remote computer resource, which again may be part of a web-based platform that implements techniques of the present teachings). The parser module may extract the directives and formulas from the spreadsheet. The directives and formulas, along with the input, may then be evaluated by an execution module (which again may be part of a web-based platform that implements techniques of the present teachings, e.g., part of the analysis engine operating on a remote computer resource). The execution module may process disparate data using the formulas extracted from the spreadsheet in the manner indicated by the associated directives per a convention or rule. The results may be stored (e.g., on a storage module of the web-based platform) and made available to a user via a viewing module (e.g., an interface of the web-based platform), and/or the results may be transmitted to the user.

The present teachings may thus include the processing of directives (e.g., directives inputted by a user such as a business analyst, or an enterprise) that indicate how a spreadsheet should be created or generated in the absence of a user. In this manner, the present teachings can alleviate the need for expensive translation, and can save on computational resources while improving computational efficiency, in order to achieve spreadsheet computation at scale. The present teachings may thus allow a user to direct, via the use of these directives, how a spreadsheet is to be computed at scale without requiring the presence of the user and without the need of a computer programmer to translate the spreadsheet into another language or platform. The present teachings may thus advantageously utilize directives added by an end user using existing spreadsheet functionality.

FIG. 1 illustrates a system for securely processing disparate data sets in spreadsheets, in accordance with a representative embodiment. In general, the system 100 may include a networked environment where a data network 102 interconnects a plurality of participating devices and/or users in a communicating relationship. The participating devices may, for example, include any number of user devices 110, remote computing resources 120, and other resources 130.

The data network 102 may be any network(s) or inter-network(s) suitable for communicating data and information among participants in the system 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m)), fifth generation (e.g., 5G), and/or other technologies, as well as any of a variety of corporate area or local area networks and other switches, routers, hubs, gateways, and the like that might be used to carry data among participants in the system 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The user devices 110 may include any devices within the system 100 operated by one or more users 101 for practicing the techniques as contemplated herein. Specifically, the user devices 110 may include any device for creating, preparing, editing, receiving, and/or transmitting (e.g., over the data network 102) a source spreadsheet 140 and information related thereto such as first input data 141, first output data 142, one or more formulas 144, one or more directives 146, and first output data 148. Similarly, the user devices 110 may include any device for creating, preparing, editing, receiving, and/or transmitting (e.g., over the data network 102) other data or files in the system 100, such as an encrypted file 150 and second input data 151 as described herein. The user devices 110 may also or instead include any device for managing, monitoring, or otherwise interacting with tools, platforms, and devices included in the systems and techniques contemplated herein. The user devices 110 may be coupled to the data network 102, e.g., for interaction with one or more other participants in the system 100.

By way of example, the user devices 110 may include one or more desktop computers, laptop computers, network computers, tablets, mobile devices, portable digital assistants, messaging devices, cellular phones, smart phones, portable media or entertainment devices, or any other computing devices that can participate in the system 100 as contemplated herein. As discussed above, the user devices 110 may include any form of mobile device, such as any wireless, battery-powered device, that might be used to interact with the networked system 100. It will also be appreciated that one of the user devices 110 may coordinate related functions (e.g., compiling the source spreadsheet 140, executing a runtime 160, and so on) as they are performed by another entity such as one of the remote computing resources 120 or other resources 130.

Each user device 110 may generally provide a user interface, such as any of the user interfaces described herein. The user interface may be maintained by a locally executing application on one of the user devices 110 that receives data from, e.g., the remote computing resources 120 or other resources 130. In other embodiments, the user interface may be remotely served and presented on one of the user devices 110, such as where a remote computing resource 120 or other resource 130 includes a web server that provides information through one or more web pages or the like that can be displayed within a web browser or similar client executing on one of the user devices 110. The user interface may in general create a suitable visual presentation for user interaction on a display device of one of the user devices 110, and provide for receiving any suitable form of user input including, e.g., input from a keyboard, mouse, touchpad, touch screen, hand gesture, or other use input device(s).

The remote computing resources 120 may include, or otherwise be in communication with, a processor 122 and a memory 124, where the memory 124 stores code executable by the processor 122 to perform various techniques of the present teachings. More specifically, a remote computing resource 120 may be coupled to the data network 102 and accessible to the user device 110 through the data network 102, where the remote computing resource 120 includes a processor 122 and a memory 124, where the memory 124 stores code executable by the processor 122 to perform the steps of a method according to the present teachings.

The remote computing resources 120 may also or instead include data storage, a network interface, and/or other processing circuitry. In the following description, where the functions or configuration of a remote computing resource 120 are described, this is intended to include corresponding functions or configuration (e.g., by programming) of a processor 122 of the remote computing resource 120, or in communication with the remote computing resource 120. In general, the remote computing resources 120 (or processors 122 thereof or in communication therewith) may perform a variety of processing tasks related to the secure processing of disparate data sets according to functionality of a spreadsheet as discussed herein. For example, the remote computing resources 120 may manage information received from one or more of the user devices 110, and provide related supporting functions such as compiling the source spreadsheet 140, generating, receiving, and/or transmitting runtimes 160, communicating with other resources 130, storing data, and the like. The remote computing resources 120 may also or instead include backend algorithms that react to actions performed by a user 101 at one or more of the user devices 110. The backend algorithms may also or instead be located elsewhere in the system 100.

The remote computing resources 120 may also or instead include a web server or similar front end that facilitates web-based access by the user devices 110 to the capabilities of the remote computing resource 120 or other components of the system 100. A remote computing resource 120 may also or instead communicate with other resources 130 in order to obtain information for providing to a user 101 through a user interface on the user device 110. Where the user 101 specifies certain criteria for data processing, this information may be used by a remote computing resource 120 (and any associated algorithms) to access other resources 130. Additional processing may be usefully performed in this context such as recommending certain data processing operations and techniques.

A remote computing resource 120 may also or instead maintain, or otherwise be in communication with, a database 126 of content such as one or more runtimes 160, along with an interface for users 101 at the user devices 110 to utilize the content of such a database 126. Thus, in one aspect, a remote computing resource 120 may include a database 126 of runtimes 160, and the remote computing resource 120 may act as a server that provides a platform for selecting and using a runtime 160, and/or providing supporting services related thereto.

A remote computing resource 120 may also or instead be configured to manage access to certain content (e.g., for an enterprise associated with a user 101 of the user device 110). In one aspect, a remote computing resource 120 may manage access to a component of the system 100 by a user device 110 according to input from a user 101.

The other resources 130 may include any resources that may be usefully employed in the devices, systems, and methods as described herein. For example, the other resources 130 may include without limitation other data networks, human actors (e.g., programmers, researchers, annotators, editors, analysts, and so forth), sensors (e.g., audio or visual sensors), data mining tools, computational tools, data monitoring tools, and so forth. The other resources 130 may also or instead include any other software or hardware resources that may be usefully employed in the networked applications as contemplated herein. For example, the other resources 130 may include payment processing servers or platforms used to authorize payment for access, content or feature purchases (e.g., certain files and runtimes 160), or otherwise. In another aspect, the other resources 130 may include certificate servers or other security resources for third-party verification of identity, encryption or decryption of data, and so forth. In another aspect, the other resources 130 may include a desktop computer or the like co-located (e.g., on the same local area network with, or directly coupled to through a serial or USB cable) with one of the user devices 110 or remote computing resources 120. In this case, the other resource 110 may provide supplemental functions for the user device 110 and/or remote computing resource 120. Other resources 130 may also or instead include supplemental resources such as scanners, cameras, printers, input devices, and so forth.

The other resources 130 may also or instead include one or more web servers that provide web-based access to and from any of the other participants in the system 100. While depicted as a separate network entity, it will be readily appreciated that the other resources 130 (e.g., a web server) may also or instead be logically and/or physically associated with one of the other devices described herein, and may, for example, include or provide a user interface for web access to a remote computing resource 120 or a database 126 in a manner that permits user interaction through the data network 102, e.g., from a user device 110.

It will be understood that the participants in the system 100 may include any hardware or software to perform various functions as described herein. For example, one or more of the user device 110 and the other resources 130 may include a memory 124 and a processor 122.

The various components of the networked system 100 described above may be arranged and configured to support the techniques described herein in a variety of ways. For example, in one aspect, a user device 110 connects through the data network 102 to a server (e.g., that is part of one or more of the remote computing resource 120 or other resources 130) that performs a variety of processing tasks related to securely processing disparate data sets according to functionality of a spreadsheet. For example, the remote computing resource 120 may include a server that hosts a website that runs a platform for securely processing disparate data sets according to functionality of a spreadsheet. More specifically, a user 101 associated with the user device 110 and having appropriate permissions for using the system 100 may use the user device 110 to transmit a source spreadsheet 140 over the data network 102 to the remote computing resource 120. The source spreadsheet 140 may include first input data 141 (e.g., a first input data set), one or more formulas 144 configured to manipulate the first input data 141 thereby generating first output data 142 (e.g., a first output data set), and one or more directives 146 associated with the source spreadsheet 140. The directives 146 may describe at least one of the first input data 141, the one or more formulas 144, and the first output data 142. The remote computing resource 120 may receive the source spreadsheet 140 from the user 101 over the data network 102 for compiling thereof. Compiling the source spreadsheet 140 may include translating data within the source spreadsheet 140 into an intermediary form and extracting the one or more directives 146 (where reformatted data 152 in the intermediary form and extracted directives 154 are shown within a file, e.g., an encrypted file 150 in the figure). The remote computing resource 120 may further write output of the compiling of the source spreadsheet 140 to a file, and may encrypt the file with an encryption key associated with the user 101 (or an enterprise to which the user 101 is associated) thereby creating the encrypted file 150. The present teachings may further include reading and executing the encrypted file 150 using a runtime 160, e.g., a runtime 160 associated with the user 101 or an enterprise to which the user 101 is associated. The reading and execution of the encrypted file 150 by the runtime 160 may occur anywhere in the system 100, such as locally at the user device 110, or remotely at the remote computing resource 120 or a web platform hosted by same. For example, the remote computing resource 120 may transmit one or more of the encrypted file 150 and the runtime 160 to the user device 110 over the data network 102, where a user 101 operating the user device 110 may then read and execute the encrypted file 150 using the runtime 160. Also or instead, the remote computing resource 120 may read and execute the encrypted file 150 using the runtime 160, and then the remote computing resource 120 may transmit output 162 from the runtime 160 to the user device 110 over the data network 102.

In an aspect, many of the techniques of the present teachings are performed by the remote computing resource 120. For example, the remote computing resource 120 may include an analysis engine (or otherwise a processor 122) configured by computer-executable code to analyze and read the source spreadsheet 140, e.g., to determine what worksheets 147 are in the source spreadsheet 140 and what formulas 144 are in these worksheets 147. Each formula 144 may be broken down into its meaningful parts in order to create an intermediary form that can be used as the basis of translation of the formulas 144 into another computer language (i.e., to create the reformatted data 152 of the encrypted file 150). Similarly, such an analysis engine of the remote computing resource 120 may extract and record all directives 146 of the source spreadsheet 140. In this manner, attributes such as dependency information, worksheet classifications, intermediary forms for language translation, and recorded directives may be written to a file and encrypted using an encryption key associated with a user's account. The output of an analysis engine of the remote computing resource 120 may thus include an encrypted file 150 that can be read and executed by a runtime 160 that was created for, or is otherwise associated with, the same account of the user 101. In this manner, only certain runtimes 160 may be able to read and execute certain encrypted files 150. In other aspects, certain runtimes 160 may be generic, meaning that a single runtime 160 may be able to be used to read and execute different encrypted files 150 associated with different users 101.

Figure 2:
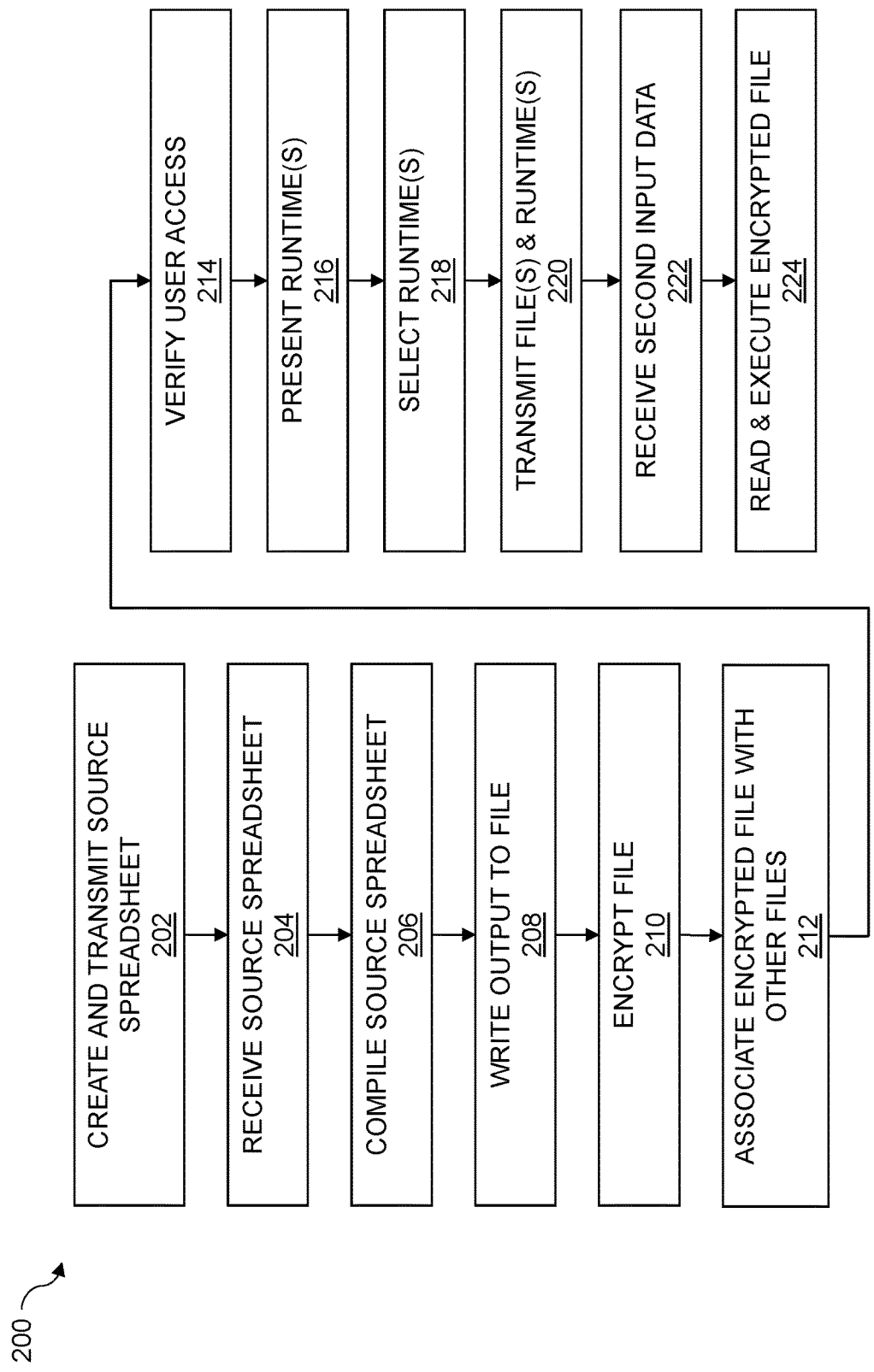
FIG. 2 is a flow chart of a method for securely processing disparate data sets in spreadsheets, in accordance with a representative embodiment.

FIG. 2 is a flow chart of a method for securely processing disparate data sets in spreadsheets, in accordance with a representative embodiment. The method 200 may utilize any of the systems or platforms described herein, e.g., the system 100 described with reference to FIG. 1. In general, the method 200 represents a technique for processing data in the same manner, or in a substantially similar manner, as source data from a source spreadsheet is processed, without having to manually create a new spreadsheet, thus saving time and resources.

As shown in step 202, the method 200 may include creating a source spreadsheet. This step 202 may also or instead include transmitting the source spreadsheet to a platform (e.g., the remote computing resource 120 of FIG. 1) for processing thereof. The source spreadsheet may be created by, or otherwise associated with, a user or client of the platform that will process the source spreadsheet. For example, an accounting firm or the like may be a client of a platform utilizing a system for securely processing disparate data sets according to functionality of a spreadsheet, and a user of the accounting firm (e.g., a business analyst or the like) may have created or otherwise retrieved the source spreadsheet for transmission to the platform for processing of the source spreadsheet. In this manner, the method 200 may further include a user taking steps to gain access to the platform, e.g., for transmission of the source spreadsheet thereto, by for example, logging onto the platform via a locally or remotely hosted user interface.

As described herein, the source spreadsheet may include a first input data set, and one or more formulas configured to manipulate the first input data set thereby generating a first output data set. For example, the source spreadsheet may include data related to amortizing a loan, and more specifically the source spreadsheet may create an amortization schedule for a fixed rate term loan. In this example, input data may include one or more of an original balance, an interest rate, and a term; output data may include principal balance, interest due, and/or a full-blown amortization schedule; and the one or more formulas may include what is needed to use the input data to generate the output data. This example is further expanded upon toward the end of this disclosure as an example use-case for the present teachings.

The source spreadsheet may further include one or more directives associated with the source spreadsheet—e.g., embedded in a comment and/or in some other manner associated with a spreadsheet, worksheet, column, and/or cell. As used herein, a directive may generally be something within a spreadsheet (or otherwise associated with a spreadsheet or content included therein) that describes something about the spreadsheet or content included therein. For example, a directive may describe at least one of the first input data set, one or more formulas, and the first output data set. In general, a directive may define functionality of the source spreadsheet—e.g., what the spreadsheet is doing to input data, such as how that input data is being manipulated, organized, compiled, displayed, or the like.

Thus, the present teachings generally include compiling a spreadsheet containing one or more directives for creating a custom, encrypted file that can be used with an associated runtime for generating, manipulating, and/or arranging data in the same or a similar manner as the original spreadsheet, but without using the original spreadsheet. These directives may be attached to cells of a spreadsheet in order to instruct a computing process on how to generate, manipulate, and/or arrange spreadsheet cells. These directives can be associated with, attached to, or embedded within spreadsheets or particular spreadsheet cells. Directives may be applied or used according to a directive convention, where application of these directive may allow new spreadsheets (or other useful output) to be created at another time and on another computing platform, i.e., different from the spreadsheet application used to create or otherwise revise the original spreadsheet.

As discussed herein, a directive may be embedded within the source spreadsheet. For example, a directive may be disposed within one or more of a note and a comment included within the source spreadsheet. In this manner, the directive may be added by a user of a platform or system as described herein for securely processing disparate data sets according to functionality of a spreadsheet—e.g., an end user associated with an enterprise that is a client of such a platform, or an administrator of such a platform. Thus, a directive may be manually added by a user. Also, or instead, the directive may be added automatically, e.g., by software that analyzes the functionality of the source spreadsheet and then adds one or more directives accordingly, based on the analysis. By way of example, one or more directives may be automatically generated as one or more of data and formulas are entered into the source spreadsheet.

The present teachings being capable of utilizing user-added directives—e.g., associating, attaching, and/or embedding directives that call for cell generation, manipulation, and/or arrangement in the comment or note creation facility available in most spreadsheets—may provide the advantage of familiarity for users, as many spreadsheet application users are familiar with the art of associating, attaching, and/or embedding a comment in a cell.

A directive may also or instead be attached to the source spreadsheet. For example, a source spreadsheet may be associated with a separate file or worksheet that includes one or more directives therein.

Thus, one familiar with the art will appreciate that other methods for associating directives to cells or worksheets also exist. One embodiment of associating these types of cell generation, manipulation, and/or arrangement directives may be to create a worksheet in the spreadsheet and use the worksheet to contain directives. Another embodiment may incorporate these directives in a separate file associated with the spreadsheet. Another embodiment may store this information in a datastore or database. Yet another embodiment may provide a specialized widget or menu item that allows a user to associate to a cell its generation, manipulation, and/or arrangement directives. The use of the common spreadsheet construct called a "named reference" is another example of an embodiment that may also or instead be used to hold cell generation, manipulation, and/or arrangement directives. Still another embodiment may include a mechanism or apparatus for submitting cell generation, manipulation, and/or arrangement instructions sometime after the spreadsheet was created, e.g., via a web browser. Another embodiment may store the directive directly in the cell as a value.

As discussed herein, a directive may define the first input data set. For example, a directive may set forth that the input data includes one or more of dates, times, currency, numbers, accounting data, percentages, monetary values (e.g., costs, expenses, etc.), ranges of any of the foregoing, text, directives themselves, notes, comments, and the like. Thus, a directive may include a category for the data. Similarly, in this manner, a directive can include a label or tag associated with certain data within the source spreadsheet. A directive may also or instead include an identification of data in the source spreadsheet.

A directive may also or instead include information regarding sorting of data in the source spreadsheet. For example, a directive may include information regarding the organization of data within the source spreadsheet—e.g., whether the data is arranged based on dates/times, numeric value, and so on. Also, or instead, a directive may set limits or thresholds for the inclusion—or the manipulation and use—of data. For example, a directive may include a command that the transformation or manipulation of data should start or stop when certain criteria are met, or set one or more starting and stopping points for the collection, listing, organization, manipulation, and/or transformation of data.

As discussed herein, a directive may be associated with one or more cells of the source spreadsheet. By way of example, a directive may include information related to at least one of creating a cell, copying a cell, stopping cell generation, filtering a cell, grouping a cell, sorting a cell, reordering a cell, labeling a cell, removing a cell, storing a cell, automatic or manual cell generation, discarding a cell, ignoring a cell, aggregating cells, and the like. An association of a directive to a cell may be determined through an analysis of one or more of a comment, a note, a named reference, a worksheet, and a cell of the source spreadsheet. In a similar manner, a directive may be associated with one or more other portions of the source spreadsheet, e.g., a worksheet of the source spreadsheet.

A directive may also or instead include an action to be taken by a runtime. For example, a directive may explicitly recite runtimes or runtime operations that can or should be implemented on the data included in the source spreadsheet, and/or a directive may otherwise be used to select a runtime (e.g., via certain information contained therein). By way of further example, in an aspect, a directive may include a command or other information that can be used by a specific runtime.

A directive can take many different forms or formats. For example, a directive may include computer code. A directive may also or instead include plain text. For example, a directive may include natural language that is human-readable.

A salient example of a directive includes a stop command, e.g., for performing calculations, for generating cells, and similar. For example, a directive may include a threshold to be met by actions performed on a set of data, e.g., a threshold such as a quantity of data (e.g., number of cells of data) or a value of the data. Continuing with this example, if such a directive has not been met, the runtime may continue to run until the directive is met. Such directives may not be commonplace in traditional, desktop-application-based spreadsheets, but these directives can be useful for the implementation and use of the present teachings.

By way of further example, a user may wish to specify in a cell or in a column of cells that cell generation should halt at a certain point. The directive added to a comment in that cell would then indicate that the value produced by this cell specifies whether or not cell generation should continue. As a non-limiting example of one such directive, to be considered for explanation-based purposes, the string "halt->true" embedded in a comment would indicate that processing should halt if the value of this cell evaluates to "true." The syntax of this directive is used as an example only—i.e., other embodiments of this method 200 may use an alternative syntax to represent this directive.

Thus, as described herein, a directive may be related to one or more of cell generation, manipulation, and/or arrangement that a user (or another) may specify via cell association, attachment, and/or embedding, for example. Some further examples for directives include, but are not limited to, one or more of: create cells; copy cells; stop creating cells; filter cells; sort cells after generation; flip cell order; label cells; remove cells; store cells; and/or discard cells. Other directives may indicate when cell generation may begin, for instance, generating cells every weekday at 4:00 AM. More directives are also or instead possible, and the presence of any examples should not suggest that these directives are limited thereby.

It is noted that the syntax or structure of directives can take on different embodiments or forms. Similarly, a directive can be associated to cell or a group of cells (such as a column, a row, and/or a worksheet) in a spreadsheet. A computing process may follow the associated directives to produce the desired result, e.g., based on a directive convention.

As shown in step 204, the method 200 may include receiving a source spreadsheet, e.g., from a user uploading the source spreadsheet onto a system or platform for securely processing disparate data sets according to functionality of a spreadsheet, or otherwise receiving the source spreadsheet from a user. Stated otherwise, the source spreadsheet may be received via an uploading of the source spreadsheet onto a web-based platform. The source spreadsheet may also or instead be affirmatively retrieved by a remote computing resource or the like that operates such a system or platform, or a portion thereof—e.g., a spreadsheet may be retrieved directly from a user's computing device and/or from a database containing one or more source spreadsheets.

As shown in step 206, the method 200 may include compiling the source spreadsheet. Compiling the source spreadsheet may include extracting one or more directives from the source spreadsheet.

Compiling the source spreadsheet may also or instead include translating data within the source spreadsheet into an intermediary form. For example, compiling the source spreadsheet may include creating intermediary forms for one or more formulas included within the source spreadsheet, e.g., within one or more worksheets of the source spreadsheet. In an aspect, the intermediary form contains sample input data and output data, as well as a generic representation of the formulas in the source spreadsheet provided by a user.

Compiling the source spreadsheet may also or instead include extracting dependency information. In this manner, relationships between different data or other information within the source spreadsheet may be accounted for when compiling the source spreadsheet—e.g., data (or other parts of a spreadsheet, such as cells, worksheets, or the like) that is related to, depends from, is associated with, or references other data or information.

Compiling the source spreadsheet may also or instead include analyzing the source spreadsheet to identify one or more worksheets of the source spreadsheet. Compiling the source spreadsheet may also or instead include collecting information related to a structure of the source spreadsheet. In a similar manner, compiling the source spreadsheet may also or instead include identifying and extracting formulas included within one or more worksheets of the source spreadsheet. Compiling the source spreadsheet may also or instead include extracting one or more worksheet classifications. For example, compiling the source spreadsheet may include determining which worksheets therein are input (where input worksheets may be worksheets that do not depend on other worksheets for their generation), transient (where transient worksheets may depend on other worksheets for their generation and themselves may be depended on by other worksheets for generation), and/or output (where output worksheets may depend on other worksheets for generation but do not have other worksheet generation depending on them)—this can assist a runtime as described herein when applied to the file containing the compiling step's output.

As shown in step 208, the method 200 may include writing output of the compiling of the source spreadsheet to a file. For example, this step 208 may simply include saving the output from step 206 to a database and/or to a file. The file may include one or more of the intermediary form of the data, one or more directives, dependency information, a worksheet classification, and the like. The file may further include one or more of an expiration date, an execution password, information specifically tailored for reading by one or more runtimes, and the like. For example, in certain aspects, the content of the file may include logic or code that is configured for execution by one or more runtimes as described herein.

As shown in step 210, the method 200 may include encrypting the file with an encryption key associated with a user thereby creating an encrypted file. For example, a user (e.g., a business analyst) may be associated with an enterprise that has permissions for accessing one or more of the encrypted file and the runtime. In this manner, only the user (or an enterprise associated with the user) may be able to access contents of the encrypted file.

The file that is created in step 208 and/or step 210 may thus encapsulate some or all of the information and data extracted (and/or transformed) from the source spreadsheet. This file may include some or all of the information that a runtime as described herein would need to process inputs that are the same as, or similar to, those of the first input data set from the source spreadsheet. Moreover, additional information, such as expiration dates, execution passwords, and other file instance specific information can be included in the file.

As shown in step 212, the method 200 may include associating the encrypted file with one or more other encrypted files, e.g., one or more other encrypted files created from one or more other, different spreadsheets (i.e., different from the source spreadsheet). For example, encrypted files associated with a particular user or enterprise (e.g., a client of a platform for securely processing disparate data sets according to functionality of a spreadsheet) may be associated with one another—e.g., where these files are stored in a database that can be accessed by the user or enterprise. This step 212 may also or instead include combining the encrypted file with one or more other encrypted files. For example, an encrypted file may be specific to a worksheet of a particular spreadsheet, and this encrypted file may be combined with another encrypted file related to a different worksheet of the particular spreadsheet. Also or instead, an encrypted file may be combined with another encrypted file, e.g., based on similarly of content and/or based on a shared association (e.g., with a user, an enterprise, an industry, dependencies, and so on). This step 212 may also or instead include writing over an existing encrypted file, e.g., when a newly created encrypted file represents an update to an existing encrypted file. It will be understood that the operations described with reference to step 212 may also or instead occur using unencrypted files. Similarly, throughout this disclosure, it will be understood that, when referencing an encrypted file, a non-encrypted file could also or instead be used, unless explicitly stated to the contrary or otherwise clear from the context.

Step 212 may also or instead include combining files to form a larger file. This operation (or any of the operations of this step 212) may be performed automatically based on an analysis of the files. Thus, the method 200 may further include analyzing a file to see if it can be grouped with or combined with another file. For example, an association between files can be discovered by analyzing dependencies for inputs and outputs, and comparing these dependencies to other files. By way of further example, if a file contains a worksheet as input that is similar to a worksheet that is output of another file, the files can be linked or combined such that the output can become the input for other operations (or vice-versa). In this manner, steps for execution of an operation using a file can be performed in a reordered sequence based on linking or combining files that have associations relative to one another (e.g., when the inputs and outputs are known, steps in an operation may be reordered). To this end, files of the present teachings may include a mosaic of a plurality of files. This can improve the efficiency of such operations.

Step 212 may also or instead include tying or otherwise associating one or more files (e.g., the encrypted file) and one or more runtimes to an account of a user or enterprise. That is, these files and runtimes can be tied to one or more accounts, where access to these accounts can be provided on a case-by-case basis to specific users (e.g., employees of an enterprise, such as a business analysis for a finance-related firm). In an aspect, when this tying occurs, only files that belong to the same account as the runtime can be executed by the runtime. This constraint, coupled with the encrypted nature of these files, can allow users to safely distribute the files to their own personnel or clients without fear of unauthorized use by rival companies, bad actors, or clients that have not met certain guidelines (e.g., delinquent clients with unpaid invoices).

Furthermore, the separation of the runtime logic from the compiler logic may allow for enhanced privacy protection as well as enhanced flexibility around the deployment of a runtime. In addition to these benefits, the present teachings allow for the offering of a runtime as a service and may provide advantageous data collection capabilities. For instance, an administrator of a system of the present teachings may be able to collect information on the structure of spreadsheets, including how worksheets and/or data are defined, and how spreadsheets functions are used and combined. Also, or instead, an administrator of a system of the present teachings may be able to ensure that a customer is using the software of the present teachings effectively, and this can yield insight into a customer's development process. Further, each compilation may be done for a fee, which can provide a continuing revenue stream for an administrator of a system of the present teachings as its customers build more and more applications. Similarly, each implementation of a runtime can be done for a fee.

Before using or accessing one or more of the file containing the compiling step's output, the encrypted file, a runtime, or the platform or system itself (or a component thereof), permissions of a user or enterprise may be checked and verified. As such, as shown in step 214, the method 200 may include verifying user access. For example, the method 200 may include verifying that a certain runtime and/or a certain encrypted file are associated with a certain user (or an enterprise to which the user is associated with), or the user otherwise has permission(s) for access to such components. To this end, the method 200 may include preventing use of an attribute of the platform or the platform itself when a user cannot be verified, e.g., preventing use of an encrypted file and/or a runtime when an association of one or more of the runtime and the encrypted file with the user cannot be verified.

As shown in step 216, the method 200 may include presenting one or more runtimes to a user (or administrator) for use, e.g., for reading and executing the encrypted file. Thus, the method 200 may include presenting a list of a plurality of runtimes to a user for selection of one or more of the plurality of runtimes. For example, permissions of an enterprise may provide a user associated therewith with access to a plurality of runtimes, and each of these plurality of runtimes may be presented to a user for selection. Similarly, the permissions of an enterprise may provide access to a plurality of encrypted files associated with that enterprise. In this manner, the method 200 may include presenting a list of a plurality of encrypted files to a user for selection of one or more of the plurality of encrypted files.

A runtime may generally include an environment or program to read and/or execute the encrypted file (or a non-encrypted file) that is based on the compiling of the source spreadsheet. Thus, a runtime may address a number of issues including the management of application memory, how a program accesses variables, mechanisms for passing parameters between procedures, interfacing with an operating system, and so on. A runtime as described herein may thus be platform specific (e.g., Clojure, Java, C, C++, Groovy, Python, Go, Ruby, C#, Scala, and the like). In this manner, a runtime can be specifically tailored for use by a specific user, e.g., based on the platform used by the user. Thus, in an aspect, the runtime includes a library that can execute logic stored in an encrypted file that is created in step 208 and/or step 210. The runtime may read the file and extract worksheet dependencies, worksheet classifications, directives, and/or intermediary forms of data. In this manner, when given input that conforms to the input of the source worksheet that is specified in the file, the runtime can produce output by executing against this provided input, using the information in the file (at least in part) to guide execution.

Therefore, in general, a runtime as described herein may extract information from the encrypted file to manipulate input data different from the first input data set according to functionality of the source spreadsheet. The information extracted from the encrypted file by the runtime may include one or more of the intermediary form of the data, one or more directives, dependency information, a worksheet classification, and so on.

As discussed herein, a runtime as described herein may also or instead include a library that executes logic stored in the encrypted file. To this end, a runtime may also or instead be configured to decrypt the encrypted file. As such, the runtime may be associated with a particular user or enterprise such that the runtime utilizes a specific encryption key associated therewith for decrypting the encrypted file.

A runtime as described herein may also or instead include one or more directive conventions that specify an order and a context for execution of the one or more directives included within the encrypted file. The runtime may also or instead be in communication with another resource (e.g., a database) that includes such conventions. Thus, in this manner, the runtime may include one or more rules related to the use of the directives.

A runtime as described herein may also or instead utilize directives according to permissible combinations. By way of example, some directives may not be combinable with other directives—e.g., 'sort' and 'group' directives may not be combined as they can disrupt each other. Thus, the runtime may include one or more rules (or otherwise operate according to one or more rules) that specify use of directives according to one or more permissible combinations and/or impermissible combinations for the directives.

It will be understood that logic of a runtime and logic of an encrypted file may be separate as explained above. This may provide for several advantages, such as one or more of enhanced security (e.g., by having each of the runtime and the encrypted file associated with a user, such that access to only one may not suffice for retrieving useful information), financial opportunities (e.g., each compilation can be charged separately, and/or specific runtimes or files can be distributed for fees), and ease of use for end users.

It will be further understood that a runtime of the present teachings may not perform exactly the same as a desktop-based spreadsheet application. This may be due to the fact that a desktop-based spreadsheet application is usually optimized to visually reflect the impact of changes to formulas. Part of this optimization is apparent in that desktop spreadsheets contain a graphical user interface that is used to reflect the current state of the data to the user. Desktop applications also perform recalculations automatically whenever data is changed by the user. In contrast, in an aspect, because the objective of a runtime of the present teachings may be different, it may perform operations differently and/or more efficiently. For example, data may not be dynamically changed by an end user (e.g., a human being), but instead the data may be fixed. Hence, there may be no need for the automatic detection in changes of data. Another difference may include that the compiling step (e.g., step 206 of the method 200) may not need to process all of the data in a worksheet in order to capture its meaning. Instead, by way of example, the compiling step, following convention, may stop processing rows in a spreadsheet if it is determined that the current row is effectively a duplicate of the preceding row.

As shown in step 218, the method 200 may include selecting one or more runtimes, e.g., for reading and executing the encrypted file therewith. The selection may be done by a user or an administrator of a platform for securely processing disparate data sets according to functionality of a spreadsheet. As discussed above, the runtimes that are presented to a user for selection may be those for which a user has permission to access and/or use. Also, or instead, the runtimes that are presented to a user for selection may be those that can be used with one or more specific encrypted files. The platform may also or instead include a filter for assisting in selecting a runtime and/or file.

As shown in step 220, the method 200 may include transmitting one or more of a runtime and an encrypted file to a user or enterprise. Also, or instead, a runtime and an encrypted file may be accessed remotely by a user or enterprise (e.g., via a web-based platform) such that transmission is unnecessary. Nevertheless, these components may be transmitted so that non-networked usage can be provided to users.

As shown in step 222, the method 200 may include receiving a second input data set that is different from the first input data set included in the source spreadsheet. The second input data set may be the "disparate data" described herein that is to be processed by the runtime according to functionality or other pertinent information contained in the encrypted file. In other words, the second input data set may be manipulated in the same or similar manner as the first input data set was manipulated in the source spreadsheet, using only the encrypted file read and executed by the runtime.

As shown in step 224, the method 200 may include reading and executing the encrypted file using a runtime associated with the user or a runtime for which the user otherwise has permissions for use. This step 224 may be done in conjunction with receiving different inputs, e.g., a second input data set that is different from the first input data set included in the source spreadsheet described above. That is, reading and executing the encrypted file using the runtime may include applying and manipulating the second input data set in a manner consistent with the manipulation of the first input data set in the source spreadsheet thereby generating a second output data set. This second output data set may then be transmitted or otherwise presented to a user.

The method 200 may further include a step of testing to ensure that one or more of the aforementioned steps were performed properly without error. For example, after a file is created from compiling a source spreadsheet, the same inputs may be applied when executing the file to see if the outputs match the original outputs. If there is a match, this can indicate that the source spreadsheet was compiled correctly. If there is not a match, this can indicate errors.

By way of further example, the method 200 may include automatically generating data sets that exercise edge cases that exercise exceptions. For instance, if no data is provided, this can result in an error (and an accompanying notification of such an error), or if one million rows of data are provided instead of the 5 rows that were present in the original spreadsheet, this can result in an error (and an accompanying notification of such an error).

The method 200 described above may be performed in whole or in part by a computer program product, e.g., in conjunction with a remote computing resource. Thus, an aspect described herein includes a computer program product for securely processing disparate data sets according to functionality of a spreadsheet, where the computer program product includes computer executable code embodied in a non-transitory computer readable medium that, when executing on one or more computing devices, performs the steps of: receiving a source spreadsheet from a user, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set; compiling the source spreadsheet including translating data within the source spreadsheet into an intermediary form and extracting the one or more directives; writing output of the compiling of the source spreadsheet to a file; encrypting the file with an encryption key associated with the user thereby creating an encrypted file; and reading and executing the encrypted file using a runtime associated with the user.

Figure 3:
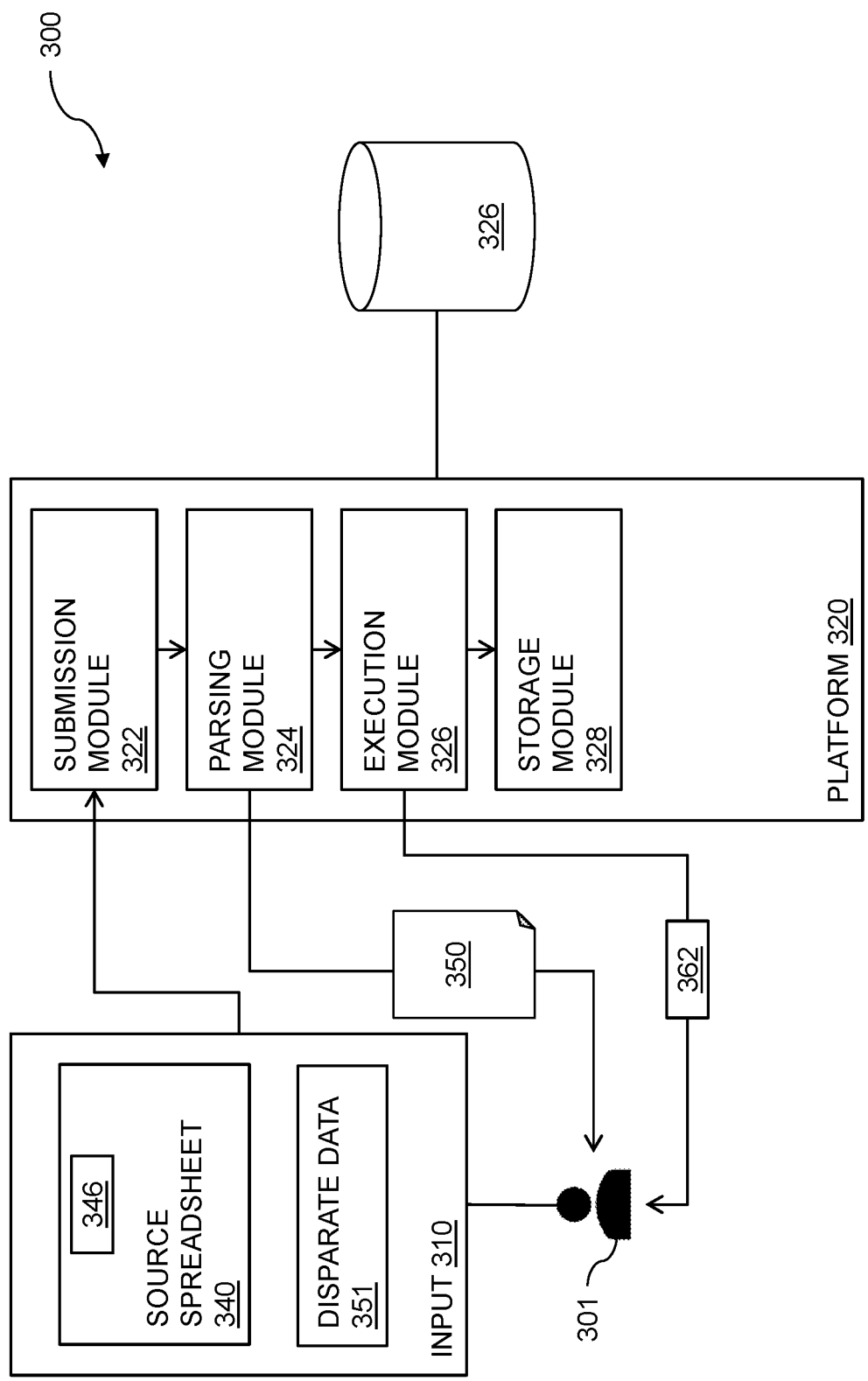
FIG. 3 illustrates a system for securely processing disparate data sets in spreadsheets, in accordance with a representative embodiment.

Another example of the present teachings is provided below with reference to FIG. 3. In particular, FIG. 3 illustrates a system for securely processing disparate data sets in spreadsheets, in accordance with a representative embodiment. The system 300 may be similar to the system 100 of FIG. 1, and may thus include any of the features described with reference thereto, and vice-versa.

Turning back to FIG. 3, the system 300 may include a user 301 (where the user 301 may be an individual or an enterprise) that provides input 310 to a platform 320 for securely processing disparate data sets according to functionality of a spreadsheet. The input 310 provided by the user 301 may include a source spreadsheet 340, which may include one or more directives 346 therein or otherwise associated therewith. The source spreadsheet 340 along with its associated directives 346 may be submitted by the user 301 to a submission module 322 of the platform 320, which may include a graphical user interface for such submissions. In general, the submission module 322 may be configured to receive the source spreadsheet 340 along with its associated directives 346. The submission module 322 may also or instead be configured to receive data from the user 301 as input 310, where this data may include original source data in the source spreadsheet 340 (which may be otherwise referred to herein as first input data) and/or disparate data 351 to be manipulated or configured in a manner substantially consistent with the functionality of the source spreadsheet 340.

After submission to the submission module 322, the input 310 may be transmitted to a parsing module 324, which may be the component in the system 300 or platform 320 that is configured to perform a compilation operation on the input 310. In this manner, the parsing module 324 may deploy a model (which may include an algorithmic model) on the input 310. One familiar with the art will appreciate that the parsing module 324 may also or instead be included within a spreadsheet application itself. Deployment by the parsing module 324 may include one or more of the following, without limitation: deployment within a spreadsheet application; deployment in a computer program located on a user computing device; deployment on a server connected via a data network; and so on. The parsing module 324 may extract the directives 346 and perform other compiling functionality as described herein. Output of the parsing module 324 may include a file 350 (e.g., an encrypted file), which may be transmitted to the user 301 or otherwise saved for use, e.g., in a database 326 on or in communication with the platform 320.

The parsing module 324 may then send output (e.g., one or more of the file 350, the source spreadsheet 340, the directives 346, and the disparate data 351) to an execution module 326. The execution module 326 may generate output 362, which may include one or more of new output data (which may be otherwise referred to herein as second output data), a new spreadsheet, and the like. For example, output 362 generated by the execution module 326 may include one or more new spreadsheets based on the information in the source spreadsheet 340 and its directives 346, as applied to the disparate data 351 as input 310. Continuing with this example, the execution module 326 may generate cells, e.g., moving from left to right then top to bottom following conventions or rules specified by the user 301 or platform 320, where such conventions may be stored in a database 326 in communication with the platform 320. For example, each cell of the new spreadsheet may be generated by executing the formulas created in each cell using a formula library, which again may be stored in a database 326 in communication with the platform 320. Once generation is completed, a cell sorting directive may then be applied to the new worksheet. Finally, the new spreadsheet results may be stored by a storage module 328, where contents of such a storage module 328 may be made available for examination by the user 301. Also, or instead, the output 362 may be transmitted to the user 301, e.g., for offline use.

The present teachings may thus include a technique for associating with, attaching to, or embedding within cells in a spreadsheet, one or more directives that specify the generation, manipulation, and/or arrangement of cells to be performed at a later time and place. In particular, the present teachings may enable a user, whether human or a computing process, to instruct another computing process how to perform cell generation, manipulation, and/or arrangement on a computing platform at some other time. That future cell generation, manipulation, and/or arrangement may occur according to a schedule or in reaction to some predefined event, occurrence, and/or incident and may take place on a same or different computing platform that the spreadsheet along with its associated cell generation, manipulation, and/or arrangement directives were created.

An example use case of an aspect of the present teachings will now be described in the context of amortizing a loan. That is, a goal may be to create an amortization schedule for a fixed rate term loan, and to figure out how much interest a borrower has to pay given particular loan characteristics. For the sake of example, this may be a 30 year fixed loan for $250,000 at 4.5% per annum that is payable on a monthly basis. If one were to set up a source spreadsheet to determine the total interest to be paid, a relatively simple spreadsheet layout can accomplish this in the following manner. First, a worksheet can define the loan characteristics, with four columns and two rows; the first row would be the headers for the columns (where square brackets can indicate cell entries):

[ID] [Original Balance] [Rate] [Term]

and the second row would have the actual loan characteristics, namely:

[Loan1] [250,000] [4.5] [30]

The above has defined this example for a loan, where this worksheet can simply be called "Loan" for this example, and where this worksheet represents an input worksheet.

Continuing with this example, the amortization schedule may include several columns, but of particular interest for this example are the original balance, the principal, and the interest due columns. These columns can be defined as if one were creating an amortization schedule, filling the cells with the required formulas. A drag down operation for the rows (until reaching the 360th period for generating a 30 year contractual schedule) can fill out the schedule.

Continuing with this example, a summary worksheet may be created, which may simply include a single cell that runs the formula, assuming the interest column on the amortization schedule worksheet is column C:

=SUM('Amortization Schedule'!C:C)

At this point in this example, conceptually the worksheet would now include the loan information, the amortization schedule, and the summary. So, thus far in this example, only a spreadsheet that amortizes a 30 year fixed rate loan has been created.

Continuing with this example, now that amortizing a 30 year fixed rate loan has been accomplished, this source spreadsheet can be submitted to a platform implementing an aspect of the present teachings for compiling and creation of an encrypted file that can be executed by a runtime according to functionality of the source spreadsheet. That is, the source spreadsheet can be submitted for generating an encrypted file that encapsulates all of the logic in the source spreadsheet in such a way to enable running it at scale. The file can be embedded in an existing cloud application via a runtime that is deployed on premises as a containerized application server, or privately run in a protected cloud environment. Either way, the present teachings can make it possible to amortize millions of 30 year fixed loans.

This example can be accomplished using the present teachings as described herein, where an aspect of the present teachings can automatically determine which worksheets in the source spreadsheet are input and what the ultimate output worksheets should be. In the context of this example, an aspect of the present teachings can determine that the aforementioned loan worksheet is the input, the summary worksheet is the output, and the amortization schedule worksheet holds intermediate values. Once this analysis is complete, an aspect of the present teachings encapsulates this knowledge into an encrypted file.

Continuing with this example, to run this module, a user can provide a platform implementing the present teachings with a file (e.g., a CSV file or another spreadsheet) that holds multiple loans formatted in the same way the loan worksheet was formatted, with one loan per row. When asked to run the encrypted file against this list of loans, the runtime will apply the encrypted file to each loan in the list and append the results to an output list that takes on the format of the summary worksheet. Thus, by creating a spreadsheet that can create an amortization schedule for one loan, a user can produce schedules for as many loans as they desire, and because the entire technique can be run in the cloud, desktop environments may no longer be a constraint.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from the same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for securely processing disparate data sets according to functionality of a spreadsheet, the method comprising:
  receiving a source spreadsheet from a user, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set;
  compiling the source spreadsheet including translating data within the source spreadsheet into an intermediary form and extracting the one or more directives;
  writing output of the compiling of the source spreadsheet to a file;
  encrypting the file with an encryption key associated with the user thereby creating an encrypted file;
  receiving a second input data set different from the first input data set; and
  reading and executing the encrypted file using a runtime associated with the user, the runtime applying and manipulating the second input data set in a manner consistent with the manipulation of the first input data set in the source spreadsheet thereby generating a second output data set,
  wherein the user is associated with an enterprise having permissions for accessing one or more of the encrypted file and the runtime, and wherein the permissions of the enterprise provide the user with access to a plurality of runtimes.

2. The method of claim 1, wherein the runtime extracts information from the encrypted file to manipulate input data different from the first input data set according to functionality of the source spreadsheet.

3. The method of claim 2, wherein the information extracted from the encrypted file includes one or more of the intermediary form of the data, the one or more directives, dependency information, and a worksheet classification.

4. The method of claim 1, wherein compiling the source spreadsheet further comprises extracting dependency information and one or more worksheet classifications.

5. The method of claim 1, wherein compiling the source spreadsheet further comprises:
  analyzing the source spreadsheet to identify one or more worksheets of the source spreadsheet, and to identify and extract formulas included within the one or more worksheets; and
  creating intermediary forms for the formulas included within the one or more worksheets.

6. The method of claim 1, wherein the one or more directives are disposed within one or more of a note and a comment included within the source spreadsheet.

7. The method of claim 1, wherein the one or more directives define functionality of the source spreadsheet.

8. The method of claim 1, wherein the one or more directives include information related to at least one of creating a cell, copying a cell, stopping cell generation, filtering a cell, sorting a cell, reordering a cell, labeling a cell, removing a cell, storing a cell, cell generation, and discarding a cell.

9. The method of claim 1, wherein the one or more directives include an action to be taken by the runtime.

10. The method of claim 1, wherein the runtime is configured to decrypt the encrypted file.

11. The method of claim 1, wherein the runtime operates according to one or more rules, wherein the one or more rules identify one or more permissible combinations for execution of the one or more directives.

12. The method of claim 1, further comprising presenting a list of the plurality of runtimes to the user for selection of one or more of the plurality of runtimes.

13. The method of claim 1, further comprising:
  verifying that the runtime and the encrypted file are associated with the user; and
  preventing use of the encrypted file by the runtime when an association of one or more of the runtime and the encrypted file with the user cannot be verified.

14. The method of claim 1, wherein the source spreadsheet is received via an uploading of the source spreadsheet onto a web-based platform.

15. A computer program product for securely processing disparate data sets according to functionality of a spreadsheet, the computer program product comprising computer executable code embodied in a non-transitory computer readable medium that, when executing on one or more computing devices, performs the steps of:
  receiving a source spreadsheet from a user, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set;
  compiling the source spreadsheet including translating data within the source spreadsheet into an intermediary form and extracting the one or more directives;
  writing output of the compiling of the source spreadsheet to a file;
  encrypting the file with an encryption key associated with the user thereby creating an encrypted file;
  receiving a second input data set different from the first input data set; and
  reading and executing the encrypted file using a runtime associated with the user, the runtime applying and manipulating the second input data set in a manner consistent with the manipulation of the first input data set in the source spreadsheet thereby generating a second output data set,
  wherein the user is associated with an enterprise having permissions for accessing one or more of the encrypted file and the runtime, and wherein the permissions of the enterprise provide the user with access to a plurality of runtimes.

16. The computer program product of claim 15, wherein the computer executable code further performs the step of presenting a list of the plurality of runtimes to the user for selection of one or more of the plurality of runtimes.

17. A system for securely processing disparate data sets according to functionality of a spreadsheet, the system comprising:
  a data network;
  a user device coupled to the data network; and
  a remote computing resource coupled to the data network and accessible to the user device through the data network, the remote computing resource including a processor and a memory, the memory storing code executable by the processor to perform the steps of:
    receiving a source spreadsheet from the user over the data network, the source spreadsheet including a first input data set, one or more formulas configured to manipulate the first input data set thereby generating a first output data set, and one or more directives associated with the source spreadsheet, the one or more directives describing at least one of the first input data set, the one or more formulas, and the first output data set;

compiling the source spreadsheet including translating data within the source spreadsheet into an intermediary form and extracting the one or more directives;

writing output of the compiling of the source spreadsheet to a file;

encrypting the file with an encryption key associated with the user thereby creating an encrypted file;

receiving a second input data set different from the first input data set; and reading and executing the encrypted file using a runtime associated with the user, the runtime applying and manipulating the second input data set in a manner consistent with the manipulation of the first input data set in the source spreadsheet thereby generating a second output data set, wherein the user is associated with an enterprise having permissions for accessing one or more of the encrypted file and the runtime, and wherein the permissions of the enterprise provide the user with access to a plurality of runtimes.

18. The system of claim 17, wherein the code further performs the step of:

transmitting one or more of the encrypted file and the runtime to the user device over the data network; and transmitting output from the runtime to the user device over the data network.

19. The system of claim 18, wherein the output from the runtime transmitted to the user device over the data network includes the second output data set.

20. The system of claim 18, wherein the code further performs the step of presenting a list of the plurality of runtimes to the user for selection of one or more of the plurality of runtimes.

* * * * *